United States Patent [19]

Luoma et al.

[11] Patent Number: 4,700,246
[45] Date of Patent: Oct. 13, 1987

[54] DISK DRIVE WITH ISOLATED VOICE COIL MOTOR MAGNET

[75] Inventors: Richard W. Luoma, Chatfield; John R. Reidenbach; Clarence R. Schwieters, both of Rochester, all of Minn.

[73] Assignee: International Business Machines Corporation, Armonk, N.Y.

[21] Appl. No.: 798,041

[22] Filed: Nov. 14, 1985

[51] Int. Cl.⁴ .................. G11B 21/08; G11B 17/02
[52] U.S. Cl. ........................................ 360/98; 360/106
[58] Field of Search ....................... 360/106, 97–99; 310/13

[56] References Cited

U.S. PATENT DOCUMENTS 4,034,411  7/1977  Kraemer et al. ................. 360/106
4,439,699  3/1984  Brende et al. .................... 360/106

Primary Examiner—Robert S. Tupper
Attorney, Agent, or Firm—Robert W. Lahtinen

[57] ABSTRACT

An actuator for positioning transducers with respect to a disk storage device data surface provides a substantially sealed head-disk enclosure from which the voice coil motor permanent magnets are excluded. The mounting flange-inner core member, end cap and collar and shorted turn provide a sealed enclosure about the transducer carriage, voice coil and working air gap of the voice coil motor (VCM) with the permanent magnet and outer core pieces assembled to the device thereafter. The permanent magnets can be excluded from the clean room assembly area and this source of the most destructive particulate contamination are outside the head-disk enclosure.

7 Claims, 5 Drawing Figures

DISK DRIVE WITH ISOLATED VOICE COIL MOTOR MAGNET

BACKGROUND OF THE INVENTION

This invention pertains to magnetic disk storage devices and more particularly to actuators for such devices where the permanent magnets associated with the actuator drive motor are isolated from the head-disk enclosure.

The accepted and most effective device for driving a magnetic disk drive actuator is a voice coil motor. One component of the voice coil motor is the permanent magnet that establishes the flux field in the gap in which the voice coil is driven. As faster access times are sought the permanent magnets are made increasingly stronger to enhance the flux field in the air gap. The fields about both the permanent magnet and the voice coil must be shielded from the disk enclosure where the transducer reads and writes minute magnetic domains at the data surface of the disk. The other problem presented by the permanent magnet is the possibility that particulate contamination might be released from the material of such strong magnets. Any particulate material from the magnet must be excluded from proximity with the disk data surface to avoid not only the head crash that is induced by a particle that has a size exceeding the fly height of the transducer head, but also the destructive effects of strong magnetic particles on the data surface that would cause extensive, unretrievable alterations and erasures.

SUMMARY OF THE INVENTION

In the actuator design of the present invention the inner pole assemblies and a tubular copper shorted turn along with an end cap wholly enclose the transducer carriage within the disk enclosure. The actuator assembly, without attachment of the permanent magnets thereto, when mounted on the disk enclosure, completed by the base and cover, fully encloses the transducer head and disk assembly. This portion of the disk drive manufacture can be completed in a clean room and only after the drive has been removed from the clean room are the permanent magnets attached to the actuator.

In prior designs the permanent magnets were assembled to the balance of the actuator in the clean room, since the disk enclosure was not completed until after attachment of the magnets to the device. To avoid the problems arising from this most detrimental form of particulate contamination, efforts were made to isolate the permanent magnets by surrounding them with other components and seals and also by applying coatings to the magnet surfaces to prevent particles from breaking away. All of these measures still required the magnets to be present in the clean room assembly area and be assembled to the unit prior to the complete enclosure of the head and disk assembly.

DETAILED DESCRIPTION

Figure 1:
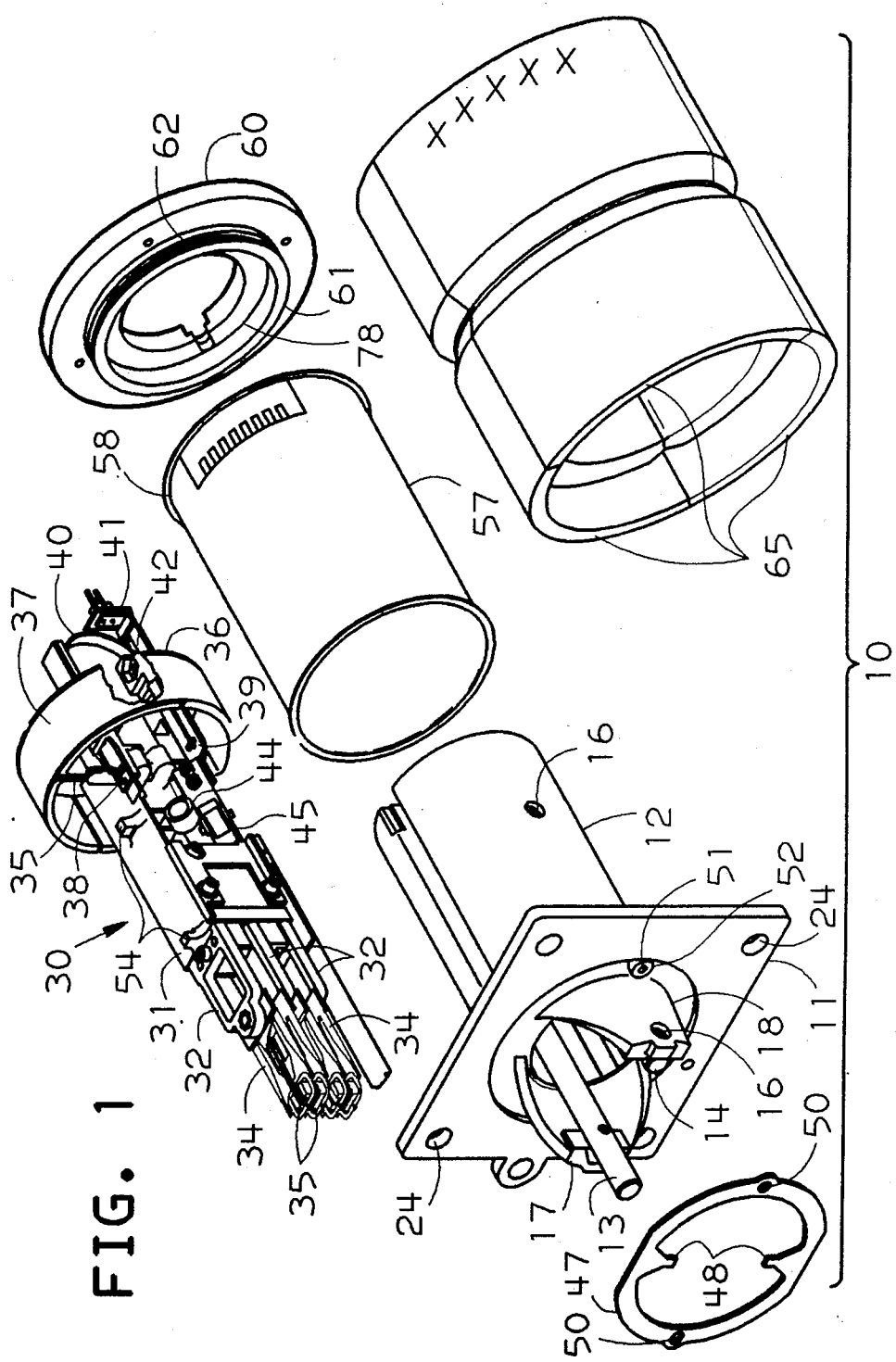
FIG. 1 is an exploded perspective view of a linear actuator for a disk drive which incorporates the present invention and includes the voice coil motor, carriage, heads and suspensions therefore and crash stop.
Figure 4:
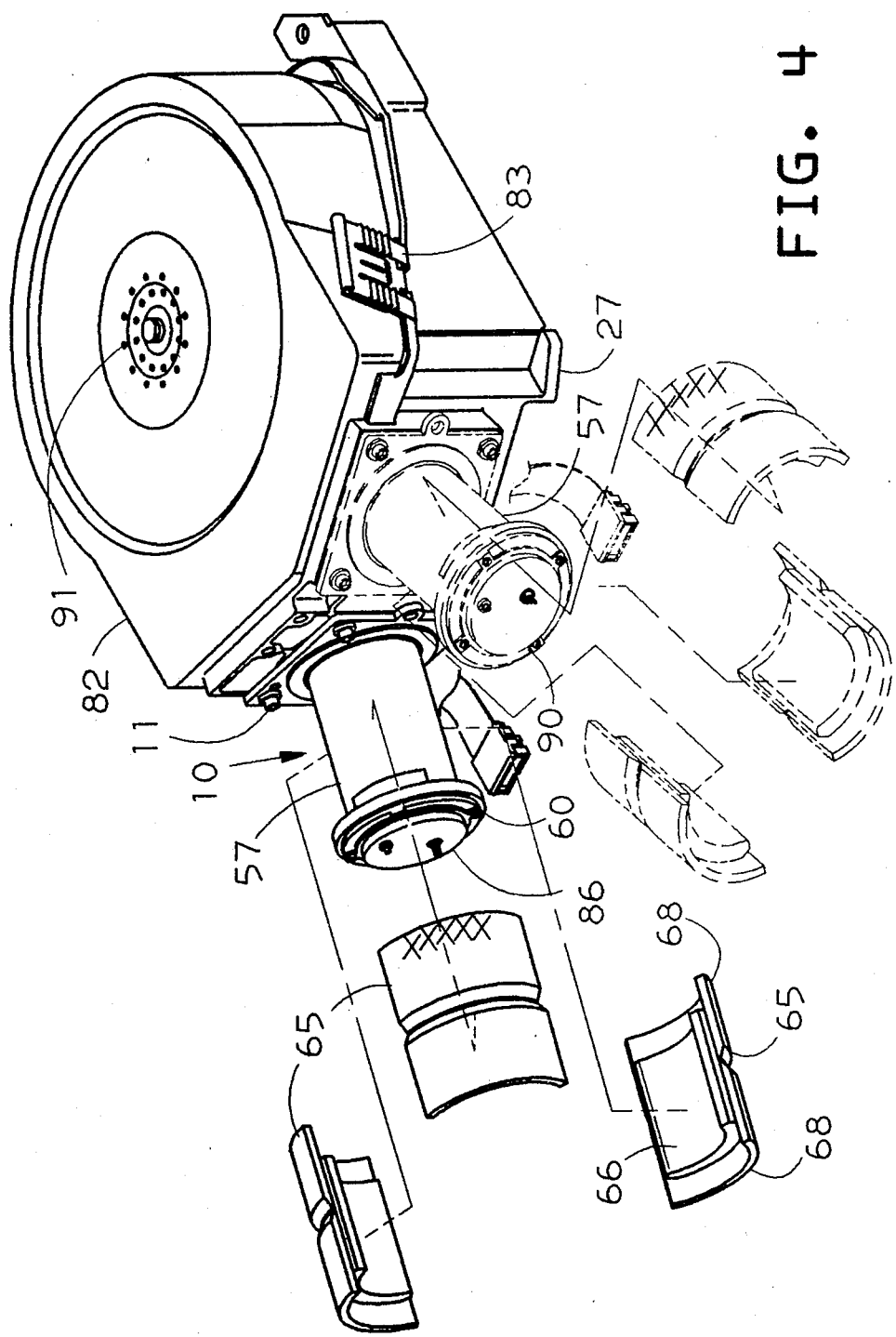
FIG. 4 is a perspective view of a disk drive assembly which carries two of the actuators of FIG. 1, partly in exploded view and partly in phantom view.

In the showing of FIG. 1, the various elements of the actuator assembly 10 are illustrated in an exploded view. The flange 11 and split cylinder inner core piece 12 are formed as a single part. The ways 13, 14 are attached to the respective sides of the inner core piece and the integrally cast projections 17, 18 by bolts 16 which have recessed heads. The way 13 engages the core piece 12 and extension 17 at grooved raised mounting pads 19, 20 (FIG. 2) that are cast as an integral part of the inner core with holes 21, 22 bored therethrough to receive the mounting bolts 16. The openings 24 in flange 11 receive the bolts which mount the actuator assembly to a disk drive base casting 27 (FIG. 4).

The carriage assembly 30 includes a body 31 to which a series of three arms 32 are secured. The upper and lower arms carry a single suspension 34 on which is mounted a slider 35 that carries the magnetic transducer. The intermediate arm extends between a pair of disks and carries two suspensions to enable heads to be flown adjacent each of the confronting data surfaces. The carriage body 30 has projections 33 which extend to and support the bobbin 36 about which the voice coil 37 is wound. The voice coil windings 37 are terminated at the terminal pad 38 adjoining the base of the upper projection 33 and connected to a flexible conductor 39. The flexible conductor arcuate portion 40 connects to the voice coil wire terminations at terminal pad 38 and is secured to the bracket 42 carried by the core assembly 12 and at the other end terminates at plug 41. The plug 41 receives the connector (not shown) through which the electrical signals or pulses are transmitted to the voice coil windings 37.

The carriage 30 is mounted for reciprocating motion in the actuator by three pairs of rollers which engage the ways 13, 14. Two longitudinally spaced pairs (not visible) of fixed canted rollers engage the cylindrical way 13 and one pair of canted rollers 44, 45 engage the way 14. The roller pair 44, 45 is mounted on the carriage 30 longitudinally intermediate the roller pairs engaging way 13. Roller 44 is fixed while roller 45 is pivotable and biased toward roller 44 so that any play or slack in the mounting system between the ways 13, 14 and carriage 30 is removed.

A crash stop 47 is mounted to the core assembly 12 by bolts which pass through openings 50 and are received in the threaded bores 51 formed in bosses 52. The crash stop is formed of resilient sheet material and presents a pair of projections 48. The carriage body 31 includes a pair of projections 54 (and a similar pair on the bottom which are not visible). In the assembled condition of the actuator, the crash stop projection 48 extends between the carriage projections 54 to limit carriage travel in each direction of reciprocation.

The cylindrical sleeve 57 with end flanges 58 is formed of non-magnetic conductive material that functions as a shorted turn in the assembled condition. The collar 60 has a cylindrical projection 61 with a groove 62 formed therein for receiving an O-ring seal 63 (FIG. 2).

The segments 65 form the radially magnetized permanent magnet and backing plate assembly. Each segment 65 encloses 120 degrees about the inner core assembly such that three segments wholly surround the assembly 12, voice coil 37 and air gap 74 of the voice coil motor. The magnet material is formed as a segment 66 as shown in FIG. 3 and the backing plate portion of the segment 65 is formed of two identical parts 68 turned end for end so that the champfered surfaces 69 axially adjoin. Using an appropriate fixture, the outer core pieces 68 are retained in axially spaced relation and the outer convex surface 70 of the magnet element 66 is bonded to the inner concave surfaces 71 of the backing plate elements 68. It will be noted from FIG. 2 that the magnet 66 is secured to the backing plate or core elements 68 nearer one end 72 which is assembled in abutting relation to flange 11.

After the backing plate-magnet segment assembly 65 is formed, the magnet 66 is energized to become a radially polarized permanent magnet. The chamfered surfaces 69 and the axial spacing between the elements 68 of outer core segments 65 are provided to establish a reluctance gap that serves to more equally divide the flux that flows through each axially end of the core assembly to create a uniform magnetic field along the working length of the air gap 74 within which the voice coil 37 reciprocates.

Figure 2:
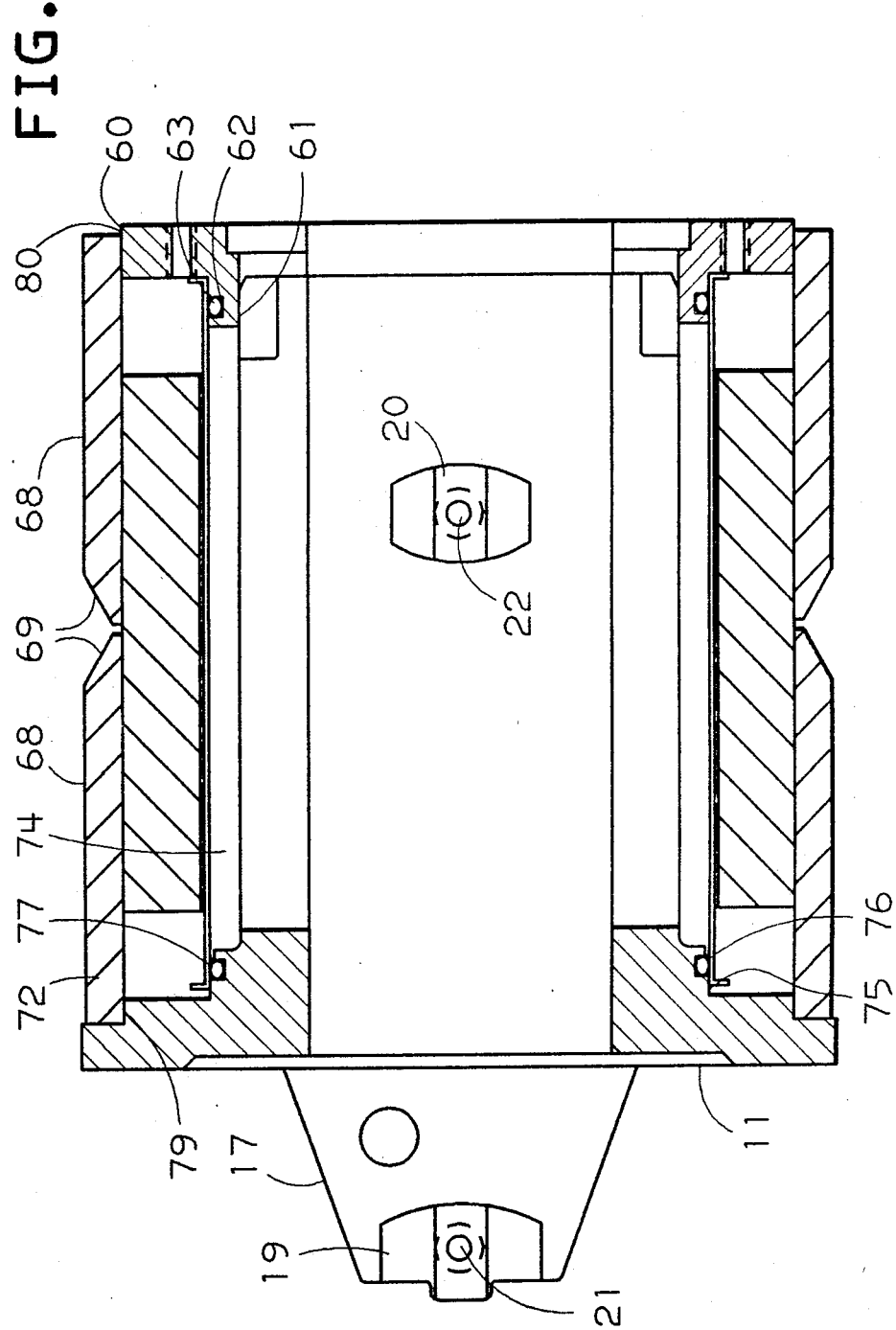
FIG. 2 is a vertical axial section of the core elements, shorted turn and magnet segments of the actuator of FIG. 1.
Figure 3:
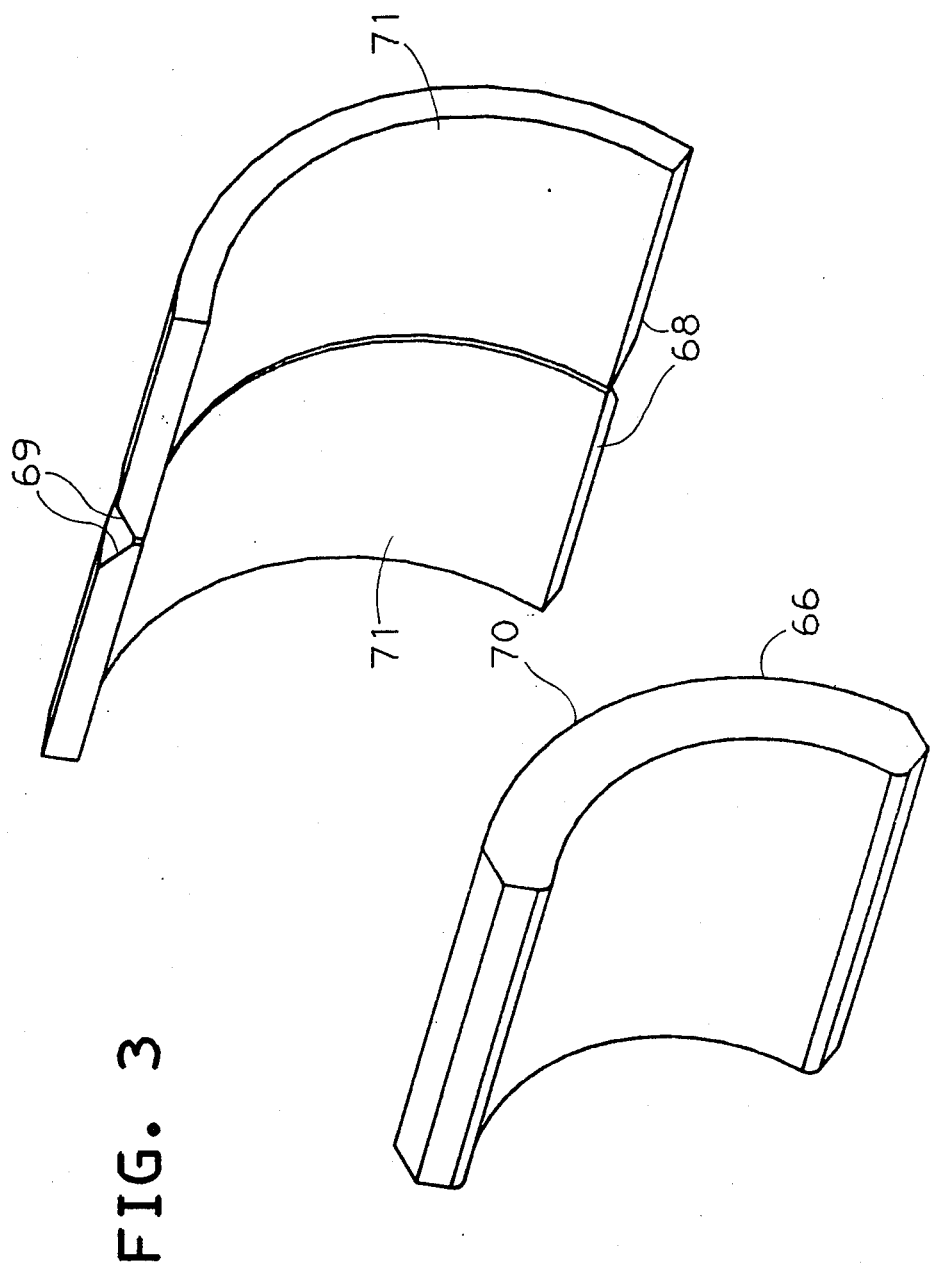
FIG. 3 is an exploded view of the magnet and backing plates that form the magnet assembly segments of the actuator of FIG. 1.

FIG. 2 shows an axial section view of the inner core 12, outer core segments 65, collar 60 and shorted turn 57. The inner core has a shoulder 75 extending from mounting flange 11 with a groove 76. The shorted turn 57 is slipped over the cylindrical surface of shoulder 75 and a sealed relationship is assured by an O-ring 77 in groove 76. The collar cylindrical inner surface 78 of projection or flange 61 is received over the distal outer axial surfaces of the halves of inner core 12 and the outer surface of flange 61 is received within the end of shorted turn 57. A seal is assured by the O-ring 63 disposed in groove 62.

The backing plate-magnet segments 65 are assembled by placing the shorter projecting core segment end 72 on the flange 11 shoulder surface 79 and the opposite outer core segment inner end surface confronting the collar outer peripheral surface 80. The outer core segments 65 can be adjusted axially to an abutting relation between segment axial end surface and the confronting surface of flange 11 and rotated where necessary with relative ease. However, the strong magnet makes removal from the flange surface 79 and collar surface 80 very difficult. The magnetic attraction is of such strength that no further means of securement is required to firmly attach the segments 65 to the other elements of the magnet and core assembly.

It will also be observed that the outer core segments 65 are assembled with very little clearance between the shorted turn 57 and the permanent magnets 66. The close tolerance which enables all the clearance between elements of the magnetic flux path to be contained in the working air gap 74 in which the voice coil 37 is positioned in the assembled condition. This close tolerance is enabled by the segment form of the magnet and outer core and would not be attainable if it were necessary to insert a strong cylindrical magnet or segments thereof axially within a cylindrical outer core.

Figure 5:
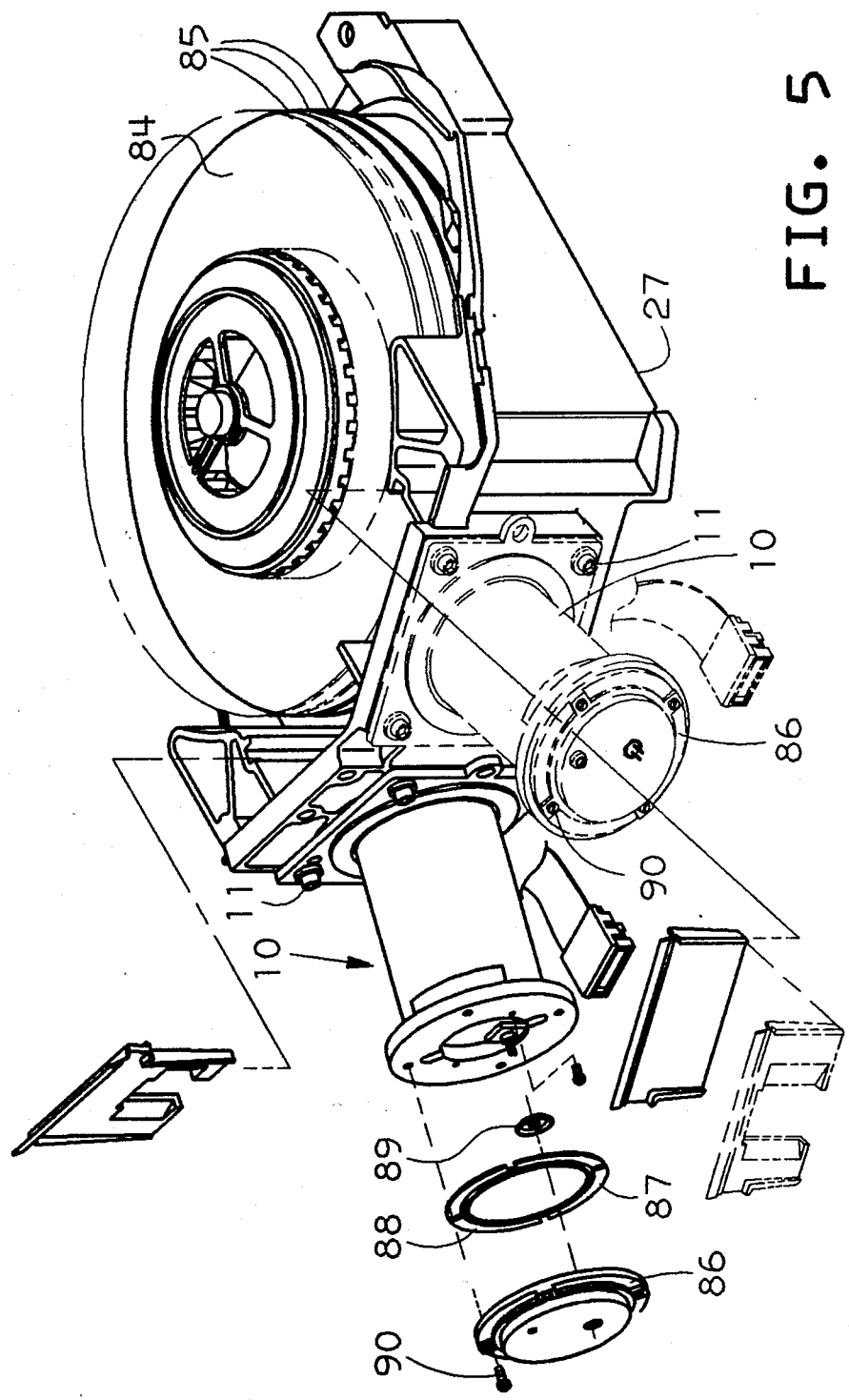
FIG. 5 is a perspective view similar to FIG. 4 with the device cover removed to show the disk assembly.

FIG. 4 shows a disk file with a base casting or frame 27 and cover 82 forming a disk enclosure. The cover 82 and frame 27 are secured together by a series of clips 83. A pair of actuators 10 are mounted on the base member 27 with carriage portions projecting through apertures to enable the transducer heads 35 to confront the data surfaces 84 of disks 85 mounted therein. As seen in FIG. 5, the disk enclosure contains four magnetic disks. The actuator 10 at the left in FIGS. 4 and 5 accesses the data surfaces of the lower two disks, while the actuator at the right in these two figures accesses the data surfaces of the upper two disks.

In addition to the elements shown in FIGS. 1 and 2, the actuator 10 further includes a voice coil motor housing cap 86 and a voice coil motor housing cap seal 87. The gasket 89 includes an aperature through which the plug 41 extends and is sealed against the cap 86. The cap 86 is secured to collar 60 by a series of four end cap mounting screws 90 and in cooperation with the inner core assembly 12, shorted turn 57 and collar 60 seal the actuator. As seen in FIG. 4, cover 82, frame 27 and actuators 10 (with the magnetic segments 65 removed or not yet assembled) form a substantially sealed head-disk enclosure that is isolated from the surrounding atmosphere except for the cover openings 91 that communicate with the enclosed volume through a breather filter. The breather filter is provided to accommodate changes in pressure and expansion and contraction of the air within the head-disk enclosure caused by temperature changes. This structure enables the disk drive to be assembled in a clean room environment to the phase of assembly wherein the head-disk assembly is completely enclosed and sealed such that any air entering must pass though the openings 91 and the associated breather filter without the magnet assembly segments 65 being present. After the head-disk assembly has been assembled to enclose the disk and transducer carriage assemblies, the unit can be removed from the clean room and the permanent magnet assemblies attached to complete the actuator fabrication. This sequence of assembly and device structure permits the exclusion of the permanent magnets from the clean room assembly area. The permanent magnets are also outside and isolated from the head disk enclosure space. It is thus not possible for particles released from the magnets to be in the disk enclosure. Such particles would not only be likely to cause head crashes as the height of the particle exceeds the fly height of the head above the disk surface, but also precludes the possibility that such particles would erase or alter the data on the disk surfaces causing non-recoverable hard errors. Particles eminating from the permanent magnets cause catastrophic results, since these are very strong permanent magnet materials in contrast to the magnetic domains on the disk which are small weaker magnets that permit relatively easy alteration.

While the invention has been particularly shown and described with reference to a preferred embodiment, it will be understood by those skilled in the art that various changes in form and details may be made therein without departing from the spirit and scope of the invention.

What is claimed is:

1. A disk drive having a sealed head-disk enclosure within which a plurality of disks are mounted for rotation in unison about a common axis and which includes an actuator for moving a plurality of transducer heads in data transducing relation with concentric tracks over the respective confronting surfaces of said disks comprising a carriage assembly connected to and supporting said transducer heads for said movement between radial positions in a transducing relation to concentric tracks on said disk surface;

a voice coil motor connected to said carriage assembly to drive the carriage assembly and the connected transducer heads;

said voice coil motor including magnetically permeable pole piece means defining a working gap, a voice coil positioned in said working gap and contained within said head-disk enclosure; and at least one permanent magnet magnetically coupled with said pole piece means to maintain a magnetic field across said working gap which may be secured to and removed from the balance of said voice coil motor without interrupting the sealed enclosure.

2. The disk drive of claim 1 wherein said voice coil motor is mounted adjacent an opening in the disk-head enclosure, said voice coil including a tubular shorted turn and an end closure that form an extension of the head-disk enclosure; and said at least one permanent magnet is secured to said actuator exterior of said head-disk enclosure to provide the magnetic field across the working gap in which the voice coil of said voice coil motor is driven.

3. A disk drive having a head-disk enclosure which is sealed against the entry of unfilterd surrounding ambient atmosphere and within which is mounted a plurality of data disks for rotation in unison about a common axis and a plurality of transducers mounted on a carriage means for movement in unison between concentric tracks on respective confronting data disk surfaces comprising a first voice coil motor actuator subassembly within said head-disk enclosure including said carriage and a voice coil connected thereto and disposed in a working gap between magnetic core element and a second voice coil motor actuator subassembly, including permeanent magnet elements of said voice coil motor, secured to said drive exterior to said head-disk enclosure without interrupting the seal of said head-disk enclosure and which are operative to impart a magnetic field across said working gap.

4. The disk drive of claim 3 wherein said enclosure is formed of a base unit and a cover with said base unit including an aperture at which said first voice coil motor actuator subassembly is mounted to complete said enclosure.

5. The disk drive of claim 4 wherein said first voice coil motor actuator subassembly includes an inner core member, a tubular shorted turn and an end closure that cooperate to close said base unit aperture.

6. The disk drive of claim 5 wherein said second voice coil motor actuator subassembly comprises permanent magnet and outer core elements.

7. The disk drive of claim 6 wherein said second voice coil motor actuator subassembly is secured to said first voice coil motor subassembly exterior of said head-disk enclosure and solely by magnetic attraction.

* * * * *